Aug. 28, 1951     E. BOWERS     2,566,160

INTERNAL DIAMETER MICROMETER

Filed May 21, 1946

Inventor:
Eric Bowers,
by Pierce & Scheffler,
Attorneys.

Patented Aug. 28, 1951

2,566,160

UNITED STATES PATENT OFFICE 2,566,160

INTERNAL DIAMETER MICROMETER

Eric Bowers, Laisterdyke, Bradford, England, assignor of one-half to Gordon Bowers, Laisterdyke, Bradford, England Application May 21, 1946, Serial No. 671,330
In Great Britain May 22, 1945

3 Claims. (Cl. 33—164)

This invention relates to micrometer gauges used for measuring internal diameters.

Various types of internal micrometers have been constructed and of these the most common is of barrel formation with axially projecting pointed anvils of which at least one is controlled by the micrometer thimble. The fault with this micrometer is that with two point contact it is not easy to obtain accurate measurement and also it cannot be used for small diameter holes.

The object of this invention is to provide an improved internal micrometer gauge.

Accordingly, an internal micrometer gauge is constructed with an axially movable plunger element controlled by the micrometer adjusting thimble to operate radial measuring anvils slidably guided in a body member, said plunger having a tapered nose to thrust the anvils outwardly. The plunger element may be separate from an operating spindle controlled by the micrometer thimble.

The plunger nose may have flats thereon or be more or less conical to contact the anvils which may have flat, knife edged, curved or other shaped inner and/or outer ends. Resilient or other retaining means may be furnished for the anvils.

The measuring anvils may be mounted in radial slots in the end of a body member furnished with a removable cover plate against which the anvils bear. The anvils may be shaped at their outer ends to extend to or beyond the face of the cover plate for measuring purposes.

Referring now to the accompanying drawing in which embodiments of the invention are shown:

In the embodiment of the invention illustrated, an internal micrometer gauge is constructed with a graduated barrel 1, internal axially movable spindle 2 and control thimble 3 similar in design to those employed for an external micrometer gauge wherein the said internal spindle forms or incorporates the movable measuring anvil. In the present construction the thimble may be graduated in the conventional manner to provide .001 readings or otherwise as desired. The known ratchet 4 extends from the thimble and a locking nut (not shown) may also be provided to lock the spindle in an adjusted position.

Figure 7:
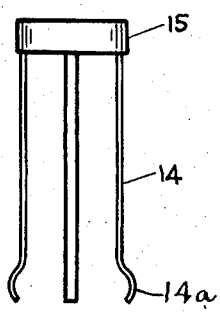
Fig. 7 is an elevation of the anvil retaining device.
Figure 1:
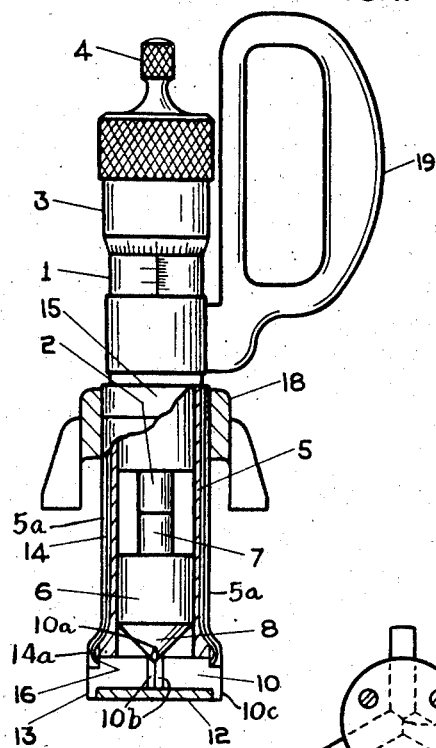
Fig. 1 is a part sectional elevation of an improved internal micrometer gauge.
Figure 6:
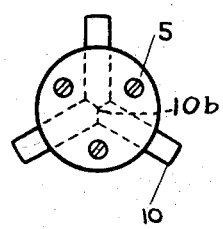
Fig. 6 is an end view of a gauge with three anvils.
Figure 4:
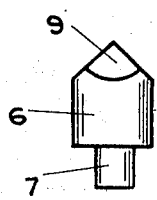
Figs. 4 and 5 show modified plungers.
Figure 5:
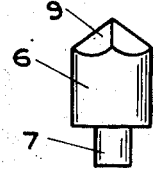

The above known micrometer parts have a hollow body member 5 associated therewith and secured to the graduated barrel to extend in axial alignment therewith. Within the body a plunger element 6 is mounted to slide freely and be urged towards the outer end of the body by the micrometer spindle. Preferably, the spindle end merely contacts the tail 7 of the plunger but the latter could be attached to or form part of the spindle. The outer end of the plunger is tapered to form a conical nose 8 (it could be made with a number of flats 9 thereon as shown in Figs. 4 and 5) to contact the inner inclined end faces 10a of four measuring anvils 10 which extend radially at right angles to the longitudinal axis of the plunger. If desired either two aligned anvils may be used or three as in Fig. 6. The anvils are arranged to slide in slots 11 located in the wall of the body at the outer end thereof, to project from the periphery of the body for measuring purposes, and a removable cover plate 12 secured to the outer end of the body by screws retains the anvils and provides easy access to the anvils and plunger. Below the inclined faces 10a, the inner ends of the anvils 10 are knife edged at 10b for them to fit closely together and their outer ends 10c have parallel faces curved transversely, although said outer ends of the anvils may be knife edged or otherwise shaped. Such outer ends are stepped at 13 to project forwardly, through recesses in the cover plate 12 flush with (or beyond) the outer face of the cover plate. To retain the anvils against falling lengthwise out of their slots, they are reduced on their longitudinal inner edges to co-act with the spring arms 14 of a spring or other ring 15 (Fig. 7) mounted on the body 5 (or barrel). Said reduction of each anvil forms a shoulder 16 with which the free end 14a of a spring arm 14 engages. Thus all the anvils are normally held together in their innermost position but can be moved outwardly against the spring pressure (which retains the anvils always in proper contact with the nose 8 of the plunger 6), and the anvils are automatically pressed back into the body 5 as the spindle 2 is withdrawn. The plunger 6 follows the spindle under the action of the spring loaded anvils on the conical nose.

Figure 8:
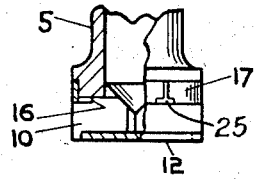
Fig. 8 is a part sectional elevation of a gauge with a modified retaining ring.
Figure 2:
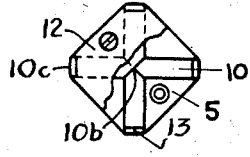
Fig. 2 is an end view with the cover plate broken away.
Figure 3:
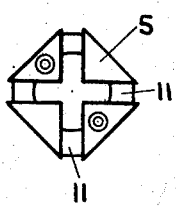
Fig. 3 is an end view of the gauge body with the cover plate removed.

The spring ring 15 may have a firm sliding movement on the body 5 so that by a slight withdrawal the arm ends 14a are disengaged from the anvils to free them. The arms 14 normally lie in longitudinal grooves 5a in the body 5 and flex out about their ends joined to the ring 15 as the anvils slide out. For some gauges it may be sufficient to mount a simple split spring ring 17 on the body immediately above the anvils as shown in Fig. 8. If this ring is slotted at 25 at the split as shown it could be rotated in stages to allow the passage of anvils so they can be interchanged easily with others of a different size.

In some cases the gauge may be required to measure an internal diameter a given distance within a hole or recess, say, a tapering hole, and to facilitate this a locating device 18 is mounted on the body 5. This device may be of solid ring form instead of a ring with arms as shown. Moreover, the device can be locked in position by a screw or made adjustable by screw threads or other means. A handle 19 is provided (it could be dispensed with) to facilitate the use of the gauge.

Figure 9:
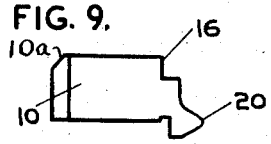
Figs. 9 to 12 are elevations of different types of measuring anvils to be used in the gauge.
Figure 10:
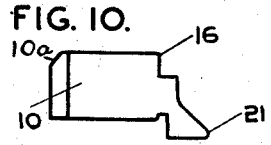
Figure 11:
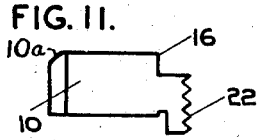
Figure 12:
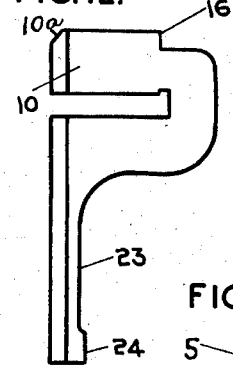

As aforesaid, different types of anvils may be employed in the gauge, e. g., for measuring barrel shaped holes the outer face of each anvil has a radius so that it is curved in its depth instead of straight. In Fig. 9 the anvil has a projection 20 (which may be of different sizes and shapes) suitable for measuring annular grooves. In Fig. 10 the projection 21 is suitable for V-slides whilst Fig. 11 shows a serrated face 22 for screw threads. As before stated, anvils may project beyond the cover plate 12 and, whilst the steps 13 may be simply extended, Fig. 12 shows a form of anvil suitable for internal diameters smaller than the diagonal across opposite corners of the body member 5. The anvil is extended at its outer end to embrace the cover plate 12 and then extends forwardly at 23 parallel with the inner knife edge of the anvil. Thus all the parts 23 will nest closely together beyond the cover plate and have outer measuring faces 24 of any desired shape.

The improved gauge could be modified without departing from the scope of the invention as defined in the claims.

What I claim and desire to secure by Letters Patent is:

1. An internal micrometer gauge comprising a graduated barrel, an adjustable thimble rotatable on said barrel, a spindle movable axially in said barrel by said thimble, a hollow body extending from said barrel, the outer end of said body terminating in a plurality of slots extending radially, a measuring anvil slidable freely in each said slot, a cover plate closing the end of said body and slots, detachable fastener means securing said cover plate in place on said body, a plunger within said body movable axially therein by said spindle, said plunger having a tapered nose bearing against the inner ends of said anvils to thrust the latter radially outward, a band slidable axially of and on said body, and a spring retaining arm for each said anvil, said retaining arms being carried by said band and the lower free ends of said arms being engageable with the outer ends of said anvils upon sliding movement of said band for urging said anvils radially inward.

2. An internal micrometer gauge as defined in claim 1 wherein the outer end of each said anvil includes a shoulder portion adapted to engage the lower free end of its associated retaining arm.

3. An internal micrometer gauge as defined in claim 1 wherein the exterior surface of said body is provided with longitudinally extending grooves for receiving and guiding said retaining arms.

ERIC BOWERS.

REFERENCES CITED

The following references are of record in the file of this patent:

UNITED STATES PATENTS

| Number | Name | Date |
|---|---|---|
| 484,813 | Nugent | Oct. 25, 1892 |
| 846,607 | Peddycoart | Mar. 12, 1907 |
| 857,810 | Kohlhaas | June 25, 1907 |
| 1,429,556 | Bartholdy | Sept. 19, 1922 |
| 1,509,578 | Bath | Sept. 23, 1924 |
| 2,047,607 | Zimmerman | July 14, 1936 |
| 2,287,097 | Graham | June 23, 1942 |
| 2,311,477 | Semerak | Feb. 16, 1943 |
| 2,478,427 | Schmid | Aug. 9, 1949 |

FOREIGN PATENTS

| Number | Country | Date |
|---|---|---|
| 524,392 | France | May 12, 1921 |